United States Patent
Hong et al.

(10) Patent No.: US 9,960,442 B2
(45) Date of Patent: May 1, 2018

(54) PROCESS FOR SEPARATING ELECTRODE FOR MEMBRANE-ELECTRODE ASSEMBLY OF FUEL CELL AND APPARATUS THEREFOR

(71) Applicants: Hyundai Motor Company, Seoul (KR); Korea Advanced Institute of Science and Technology, Daejeon (KR)

(72) Inventors: Bo Ki Hong, Seoul (KR); Byeong-Heon Jeong, Gyeonggi-do (KR); Taek-Soo Kim, Daejeon (KR); Jae-Han Kim, Daejeon (KR); Sanwi Kim, Gyeonggi-do (KR)

(73) Assignees: Hyundai Motor Company, Seoul (KR); Korea Advanced Institute of Science and Technology, Daejeon (KR)

( * ) Notice: Subject to any disclaimer, the term of this patent is extended or adjusted under 35 U.S.C. 154(b) by 323 days.

(21) Appl. No.: 14/819,079

(22) Filed: Aug. 5, 2015

(65) Prior Publication Data
US 2016/0126577 A1    May 5, 2016

(30) Foreign Application Priority Data
Oct. 30, 2014  (KR) .......................... 10-2014-0149511

(51) Int. Cl.
*H01M 4/88*    (2006.01)
*H01M 8/1004*  (2016.01)
*H01M 4/92*    (2006.01)

(52) U.S. Cl.
CPC ....... *H01M 8/1004* (2013.01); *H01M 4/8814* (2013.01); *H01M 4/8875* (2013.01);
(Continued)

(58) Field of Classification Search
CPC ............. H01M 8/1004; H01M 4/8814; H01M 6/5022; H01M 2/168
(Continued)

(56) References Cited

U.S. PATENT DOCUMENTS 5,001,023 A * 3/1991 Cheshire ................ C08G 65/14
                                                    29/623.5
5,211,984 A * 5/1993 Wilson .................. H01M 4/926
                                                    427/115
(Continued)

FOREIGN PATENT DOCUMENTS

JP    2001-085715 A    3/2001
JP    2001-177080 A    6/2001
(Continued)

OTHER PUBLICATIONS

Kim et al., "Tensile testing of ultra-thin films on water surface," Nature Communications, Published Oct. 2, 2013, p. 1-6 (Year: 2013).*
(Continued)

*Primary Examiner* — Christina A Johnson
*Assistant Examiner* — Andrew D Graham
(74) *Attorney, Agent, or Firm* — Mintz Levin Cohn Ferris Glovsky and Popeo, P.C.; Peter F. Corless (57) ABSTRACT

Disclosed are a process for separating an electrode for membrane-electrode assemblies of fuel cells from the decal transfer film and an apparatus for separating the electrode. In particular, during the electrode separating process, only an electrode is separated from the decal transfer film on which the electrode is coated, without any damage, by a freezing method for freezing the specimen on the deionized water surface, and thus, wasting the expensive MEA is prevented. Thus, mechanical properties of the pristine electrode can be rapidly quantified in advance, and therefore, long term
(Continued)

durability evaluation period during developing MEA having excellent durability is substantially reduced.

6 Claims, 9 Drawing Sheets

(52) U.S. Cl.
CPC ........ *H01M 4/926* (2013.01); *H01M 2250/20* (2013.01); *Y02E 60/521* (2013.01); *Y02T 90/32* (2013.01)

(58) Field of Classification Search
USPC .......................................................... 264/28
See application file for complete search history.

(56) References Cited

U.S. PATENT DOCUMENTS

| | | | | |
|---|---|---|---|---|
| 5,234,777 | A * | 8/1993 | Wilson | H01M 4/926 427/115 |
| 5,945,231 | A * | 8/1999 | Narayanan | H01M 4/8652 429/487 |
| 6,696,382 | B1 * | 2/2004 | Zelenay | H01M 4/886 429/524 |
| H002240 | H * | 5/2010 | Davis | 429/530 |
| 8,187,417 | B2 * | 5/2012 | Kato | H01M 4/86 156/709 |
| 8,507,151 | B2 * | 8/2013 | Budinski | H01M 4/8814 429/523 |
| 2006/0216564 | A1 * | 9/2006 | Arcella | B01D 67/0006 521/27 |
| 2006/0251932 | A1 * | 11/2006 | Wagner | H01M 8/04119 429/413 |
| 2007/0077350 | A1 * | 4/2007 | Hohenthanner | H01M 4/881 427/115 |
| 2007/0148517 | A1 * | 6/2007 | Merlo | H01M 4/921 429/483 |
| 2007/0269699 | A1 * | 11/2007 | Pak | H01M 4/8657 429/483 |
| 2009/0035615 | A1 * | 2/2009 | Urgeghe | C25B 1/46 429/480 |
| 2009/0258273 | A1 * | 10/2009 | Arcella | H01M 8/0239 429/434 |
| 2010/0203419 | A1 * | 8/2010 | Ishikawa | H01M 8/1023 429/483 |
| 2011/0240203 | A1 * | 10/2011 | Cho | B32B 37/025 156/73.1 |
| 2014/0315121 | A1 * | 10/2014 | Ghielmi | H01M 8/1004 429/534 |
| 2016/0064741 | A1 * | 3/2016 | Kumaraguru | H01M 4/8825 427/115 |

FOREIGN PATENT DOCUMENTS

| | | |
|---|---|---|
| JP | 2010-263038 A | 11/2010 |
| KR | 2010-0048922 A | 5/2010 |

OTHER PUBLICATIONS

Plazanet et al., "Water in a polymeric electrolyte membrane: Sorption/desorption and freezing phenomena," Journal of Membrane Science, Published Nov. 25, 2013, p. 419-424 (Year: 2013).*
Lee et al., "Gas diffusion layer durability under steady-state and freezing conditions", ScienceDirect, J. of Power Sources 164 (2007) 141-153.
Cho et al., "Development of a novel decal transfer process for fabrication of high-performance and reliable membrane electrode assemblies for PEMFCs", ScienceDirect, Int. J. of Hydrogen Energy 36 (2011) 12465-12473.
Luo et al., "Degradation behaviors of polymer electrolyte membrane fuel cell under freeze/thaw cycles", ScienceDirect, Int. J. of Hydrogen Energy 35 (2010) 2986-2993.
Guo et al., "Effect of freeze-thaw cycles on the properties and performance of membrane-electrode assemblies", ScienceDirect, J. of Power Sources 160 (2006) 1269-1274.
Jia et al., "Contamination and moisture absorption effects on the mechanical properties of catalyst coated membranes in PEM fuel cells", Int. J. of Hydrogen Energy 37 (2012) 6790-6797.
Lim et al., "Investigation of freeze/thaw durability in polymer electrolyte fuel cells", ScienceDirect, Int. of J. of Hydrogen Energy 35 (2010) 13111-13117.
Kim et al., "Physical degradation of membrane electrode assemblies undergoing freeze/thaw cycling: Diffusion media effects", ScienceDirect, J. of Power Sources 179 (2008) 140-146.
Park et al., "Effect of PTFE content in microporous layer on water management in PEM fuel cells", ScienceDirect, J. of Power Sources 177 (2008) 457-463.
Uchiyama et al., Buckling deformation of polymer electrolyte membrane and membrane electrode assembly under humidity cycles, J. of Power Sources 206 (2012) 37-46.

* cited by examiner

Separated Decal Transfer Film    Separated Electrode

FIG. 5B

(a) Case of Using Deionized Water Boiled and Cooled in Advance

Separated Electrode    Separated Decal Transfer Film

FIG. 6A

(b) Case of Using Deionized water Not Boiled in Advance

Separated Electrode   Separated Decal Transfer Film

FIG. 8

PROCESS FOR SEPARATING ELECTRODE FOR MEMBRANE-ELECTRODE ASSEMBLY OF FUEL CELL AND APPARATUS THEREFOR

CROSS-REFERENCE(S) TO RELATED APPLICATION

The present application claims under 35 U.S.C. § 119(a) the benefit of Korean Patent Application Number 10-2014-0149511 filed on Oct. 30, 2014, which is incorporated by reference herein in its entirety.

TECHNICAL FIELD

The present invention relates to a process for separating an electrode for membrane-electrode assemblies of fuel cells and an apparatus therefor. In particular, by the separating process including freezing an electrode specimen on a surface of deionized water, the electrode may be separated from a decal transfer film on which the electrode is coated, without any significant damage. As such, by separating the electrode from the decal transfer film but not from a membrane electrode assembly (MEA), an expensive MEA may not be destroyed and wasted when the electrode itself is separated from the MEA. Further, mechanical properties of the electrode may be rapidly quantified in advance, and therefore, long term durability evaluation period which is conducted during developing MEA of improved durability may be substantially reduced.

BACKGROUND

In general, a polymer electrolyte membrane fuel cell (PEMFC) has been widely used as a fuel cell for a vehicle. When a stack which is manufactured by laminating several hundreds of unit cells of the PEMFC is loaded on the vehicle, the unit cells of the fuel cell should stably operate over a wide current density range such that the stack normally exhibits a high-power performance of at least several tens of kW under various operational conditions of the vehicle.

In reaction mechanism of the fuel cell for generating electricity, after hydrogen supplied to an anode as an oxidation electrode in a membrane electrode assembly (MEA) of the fuel cell is dissociated into hydrogen ions (protons) and electrons, the hydrogen ions are transmitted to a cathode as a reduction electrode through a membrane, and the electrons are transmitted to the cathode through an external circuit. At the cathode, as the hydrogen ions and electrons react with oxygen molecules together, electricity and heat are produced and, at the same time, water is produced as a reaction by-product. When an appropriate amount of water produced during the electrochemical reaction is present in the fuel cell, the humidity of the MEA is desirably maintained. However, when an excessive amount of water is produced and is not appropriately removed, a "flooding" phenomenon occurs, particularly at high current density, and the flooded water prevents the reactant gases from being efficiently supplied into cells of the fuel cell, thereby causing the voltage loss.

As described above, because water is produced in the PEMFC by electrochemical reaction of hydrogen with oxygen in the air, electrochemical performance and durability may be reduced due to physical damage on cell parts such as MEA and gas diffusion layer, and on the interface between parts of fuel cells, when freeze and thaw cycles are repeated within the range from sub-zero temperature to room temperature or higher. Accordingly, robustness of the electrode in the MEA is important in order to increase freeze/thaw durability in the fuel cell. Particularly, during freezing and thawing cycles, the electrode should not be deformed or fractured even under ice forming and growing conditions in the MEA, and it is necessary that the electrode is well attached to the membrane of the MEA and, at the same time, electrode catalysts are well combined together.

Meanwhile, the fuel cell also needs to humidify the membrane in the MEA to provide water thereto by using an external humidifier. Further, dehumidification or dry-out repeatedly occurs because the cell is generally operated at high temperature of about 60° C. or greater and heat is generated itself by the electrochemical reaction, and thus, dry-wet cycling of the MEA is repeated. Under this dry-wet cycling condition, wrinkle deformation may be generated in the MEA. Accordingly, robustness of the electrode attached to the membrane as well as robustness of the membrane is important to well maintain the durability of the MEA for fuel cells.

However, the freeze and thaw durability or the dry-wet cycling durability of the MEA, which is important to the fuel cell, generally requires evaluation period of at least several months. Thus, structural factors for developing and commercializing MEA with improved durability may not be deduced in a short period of time.

Accordingly, it is necessary to quantify mechanical properties of the electrode itself, which are closely related to the long-term durability of the MEA. However, because the electrode itself may be easily damaged or deformed even by minor external stress or impact, separating only the electrode without said damage or deformation has not been successfully conducted. Typically, an electrode for MEA may be manufactured by coating a catalyst ink on a decal transfer film. The catalyst ink may be generally prepared by mixing platinum catalyst supported on (Pt/C), and ionomer binder with solvent mixtures mainly composed of isopropyl alcohol and deionized water, and then coated on the decal transfer film followed by drying thereof to manufacture an electrode.

In the related arts, measuring the mechanical properties of the electrode as being attached to the MEA has been attempted by using Double Cantilever Beam (DCB) method. However, such method may be disadvantageous because the unique properties of the electrode may be deformed by high temperature (e.g., about 100° C. or greater) and physical pressure applied when transferring the electrode coated on the decal transfer film onto the membrane. Furthermore, the expensive MEA may be used and wasted by being subjected to a fracture test. Accordingly, when the mechanical properties of the electrode is quantified as being separated from the decal transfer film, not as being tested from a final MEA product, unique properties of the electrode may be readily understood, the expensive MEA may not be wasted by a fracture test, and efficiency of developing process of a robust MEA may be increased by screening defective electrodes for MEA samples in advance prior to actually testing the long-term durability of the MEA samples.

However, so far, such method has not been reported to quantify the mechanical properties of the electrode, before transferring the electrode onto the membrane, by separating the pristine electrode from the decal transfer film on which the electrode is coated.

As conventional methods for separating a stacking member of a plurality of materials, a variety of cooling methods, for example, a separation method by spraying solid particles such as ice between joined layers, a separation method using swelling, caused by freezing liquid injected into micropores in between a substrate and a crystal thin layer, to separate the crystal thin layer grown on the substrate, a separation method by cooling a separating layer with ice in a structure of semiconductor substrate, a separating layer and a semiconductor layer, so as to reduce strength of the separating layer due to stress caused by swelling and shrinking, and a method for peeling a donor substrate of an assembly by cooling to the temperature lower than the room temperature have been suggested.

However, these conventional layer separation methods may have problems such that a subject to be separated during the layer separation process may be damaged, or the layer may be not completely separated. Accordingly, those methods may not be used for separating the pristine electrode for a fuel cell MEA, and particularly, for completely separating the pristine electrode for a fuel cell MEA for quantification of its mechanical properties due to damages during the separation process.

The description provided above as a related art of the present invention is just for helping in understanding the background of the present invention and should not be construed as being included in the related art known by those skilled in the art.

SUMMARY

Thus, the present invention has been made in an effort to solve the above-described problems associated with the related arts.

In preferred aspects, the present invention provides a novel method for separating an electrode such that the unique properties of the electrodes may be readily understood, the expensive MEA may not be wasted by a fracture test, and efficiency to develop a robust MEA may be increased by screening defective electrodes for MEA samples prior to actually testing the long-term durability of the MEA samples. For instance, the mechanical properties of the electrode may be quantified by separating the pristine electrode from the decal transfer film on which the electrode is coated, before transferring the electrode for a fuel cell MEA onto the membrane.

In one aspect, the present invention provides a process for easily separating an electrode from the decal transfer film on which the electrode is coated, before transferring the electrode onto the membrane, without significant damage. As such, the mechanical properties of the electrode for a fuel cell MEA may be conveniently and rapidly quantified.

In another aspect, the present invention provides an apparatus for separating an electrode from the decal transfer film on which the electrode is coated.

In an exemplary embodiment, provided is a process for separating an electrode from the decal transfer film for a fuel cell MEA. The method may comprise steps of: preparing an electrode specimen by coating an electrode onto a decal transfer film; soaking the electrode specimen which is coated on the decal transfer film by floating the electrode specimen on a surface of deionized water; freezing the deionized water in the state that the electrode specimen is soaked on the surface of the deionized water; removing the decal transfer film from the electrode specimen which is adhered on the frozen ice; and separating the electrode by thawing the ice.

Further provided is an apparatus for separating an electrode from the decal transfer film that comprises: an electrode specimen which is formed by coating an electrode onto a decal transfer film; a specimen tester including deionized water; a freezing device that freezes the deionized water on which the electrode specimen soaked; and a thawing device that thaws the frozen deionized water by heating thereof.

Other aspects of the invention are disclosed infra.

BRIEF DESCRIPTION OF THE DRAWINGS

The above and other features of the present invention will now be described in detail with reference to exemplary embodiments thereof illustrating the accompanying drawings which are given herein below by way of illustration only, and thus are not limitative of the present invention, and wherein:

FIGS. 4A-4C show comparative views of the separation results of an electrode.

FIGS. 5A-5B show comparative views of the separation of electrodes after removing bubbles by boiling deionized water according to an exemplary embodiment of the present invention.

FIGS. 6A-6B shows the separation of electrodes according to exemplary embodiments of the present invention.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover the exemplary embodiments as well as various alternatives, modifications, equivalents and other embodiments; which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, the present invention will be described in detail as various exemplary embodiments.

Provided is a process and an apparatus for separating an electrode from the decal transfer film whose electrode is used for fuel cell MEA applications. In particular, only the electrode may be separated by floating the electrode coated on a decal transfer film on water, particularly on deionized water followed by freezing thereof. As such, the separated electrode may be used to quantify mechanical properties of the pristine electrode prior to being applied to fuel cell MEAs.

According to exemplary embodiments of the present invention, only the electrode as a specimen for quantifying the mechanical properties thereof may be easily separated from the decal transfer film. The electrode specimen coated on the decal transfer film may be frozen on the surface of the deionized water, so as to make the interaction force between an ionomer in the electrode specimen and water molecule (the deionized water) greater than interaction force between the electrode and the decal transfer film. Since the pristine electrode may be easily separated from the decal transfer film without significant damage, the mechanical properties of the separated electrode may be quantified by direct measuring.

The separation process of the electrode specimen may include a step of preparing the electrode specimen by coating an electrode onto the decal transfer film. The coated electrode may be a typically used material for fuel cell MEAs without limitation.

For example, in the step of preparing the electrode specimen, an electrode specimen, in which an electrode is coated on a decal transfer film, may be manufactured by coating a catalyst ink onto the decal transfer film and by drying thereof. The catalyst ink may include a platinum catalyst supported on carbon (Pt/C), ionomer binder and solvent mixtures.

Particularly, when the catalyst ink for the electrode specimen is manufactured, Pt/C catalyst which contains platinum in the amount from about 30 to about 50 wt % with respect to the total weight of a solid content of the Pt/C catalyst may be used. As used herein, the "solid content of the Pt/C catalyst" may be obtained by combining contents of the platinum and the carbon support. In other words, the platinum content in the Pt/C catalyst may be from about 30 to about 50 wt % with respect to the total weight of the solid content of the Pt/C catalyst (i.e. a sum of the platinum and the carbon support). Further, the amount of the ionomer binder in a solid phase electrode may be of about 20 to about 40 wt % with respect to the total weight of the solid content of the dried electrode. As used herein, the "solid content of the dried electrode" may be obtained by combining the Pt/C catalyst content and the ionomer binder content from the dried electrode. In other words, the ionomer content in the electrode may be from about 20 to about 40 wt % with respect to the total weight of the solid content of the dried electrode (i.e. a sum of the Pt/C catalyst and the ionomer binder). The ionomer binder may be, for example, used in the form of ionomer dispersion which contains the perfluorinated sulfonic acid (PFSA)-based Nafion ionomer in the amount from about 10 to about 30 wt % with respect to the total weight of the ionomer dispersion (i.e., a sum of ionomer binder and solvents in the dispersion). Moreover, the catalyst ink may be manufactured by mixing the Pt/C catalyst and the ionomer binder with solvent mixtures that may include deionized water and isopropyl alcohol, and by a stiffing and sonicating thereof.

The above catalyst ink may be coated on the decal transfer film and then fully dried to manufacture an electrode specimen. The platinum catalyst loading amount in the electrode formed on the decal transfer film may be from about 0.01 to about 1 mg-Pt/cm$^2$, or particularly from about 0.05 to about 0.5 mg-Pt/cm$^2$ after adjusting the amount of catalyst ink or coating thickness and drying the electrode specimen. If the catalyst loading is less than the predetermined amount, for example, less than about 0.01 mg-Pt/cm$^2$, the electrode may not be evenly coated on the decal transfer film, and the electrode may be damaged or broken when separated. Meanwhile, when the catalyst loading is greater than the predetermined amount, for example, greater than about 1 mg-Pt/cm$^2$, it may be economically disadvantageous.

Accordingly, the platinum catalyst loading amount in the electrode may be from about 0.05 to about 0.4 mg-Pt/cm$^2$, and the amount of the ionomer binder in the electrode may be of about 30 wt % with respect to the total weight of the solid content of the dried electrode when manufacturing the electrode specimen.

The decal transfer film may be selected from the group consisting of polytetrafluoroethylene (PTFE), poly(ethylene terephthalate) (PET), poly(butylene terephthalate) (PBT), poly(trimethylene terephthalate) (PTT), poly(ethylene naphthalate) (PEN) and polyimide (PI), and those material may provide improved mechanical properties and excellent separability from an electrode when manufacturing an MEA by a hot press or a roll-lamination process. For example, the decal transfer film may be formed from poly(ethylene naphthalate) (PEN).

The electrode specimen coated on the decal transfer film as described above may be soaked on the surface of water.

Particularly, water used for soaking the specimen may be deionized water. When a general tap water used, the electrode may be damaged or broken and partly separated when separating, since impurities such as ions (mostly cations) in the tap water may weaken the interaction force between the water molecule and the electrode. Thus, after water and electrode are thawed, the electrode may fail to maintain its original shape, and then be destroyed into pieces. Further, when ionized water such as salt water is used, the electrode may not be properly separated from the decal transfer film because the interaction between ionomer in electrode and the water molecules in the salt water can be weakened substantially due to the contamination of ionomer by $Na^+$ cations present in the salt water. In contrast, when deionized water is used, the electrode may be separated from the decal transfer film much evenly and homogeneously, and the shape of the electrode may be well maintained without any significant damage or deformation even after frozen water melts completely. Therefore, in the present invention, unless otherwise indicated, water refers to the deionized water.

The deionized water may have the resistivity of about 10 MΩcm or greater at a temperature of about 25° C. If the resistivity value of the deionized water is less than about 10 MΩcm, the ionization degree may increase thereby contaminating the electrode.

Further, in particular, the electrode specimen may be soaked in the deionized water by facing the electrode of the electrode specimen down toward the water, and facing the decal transfer film up. In other words, when the electrode specimen is soaked on the surface of the water by floating thereof, the electrode specimen may be soaked to almost the same level with the water surface, but the electrode may be positioned toward the water and then frozen, so as to easily separate the electrode from the decal transfer film without significant damage or deformation of the electrode. Indeed, the physical interaction force between the water and the electrode may increase by freezing, and such physical interaction force may become greater than the interaction force between the electrode and the decal transfer film. On the other hand, when the decal transfer film is positioned toward the water surface, the physical interaction force between the decal transfer film and water may be negligible and less than the interaction force between the decal transfer film and the electrode in the electrode specimen, such that the electrode may not be separated from the decal transfer film. In the soaking step of the electrode specimen on the water surface, when the electrode specimen is floated on the water surface, the water may be absorbed to the electrode.

As mentioned above, after the electrode specimen is soaked in the deionized water, freezing step may be conducted. In the freezing step, a freezer may be used, and the proper amount of deionized water may be filled in the freezer. Thus, freezing may be conducted by a general method known in the related arts without limitation. The freezing temperature may be the temperature enough to freeze the deionized water, i.e. subfreezing temperatures below 0° C., and the deionized water may be frozen for about 1 to about 6 hours, or particularly for about 2 to about 6 hours. When the decal transfer film is separated before the freezing is complete, the separation may fail.

In particular, before the freezing step, a step of removing bubbles from the water, i.e., deionized water, may be additionally conducted.

The bubbles or gases may be removed from the water by boiling the water. When the freezing is conducted after boiling the water, bubbles present in the water may be readily removed, and thus, the interaction force between the water and the electrode in the electrode specimen may be evenly and substantially maintained. Accordingly, damage of the electrode during the electrode separation process may be prevented. When the bubble-removing step is not conducted, substantial amount of bubbles may be contained in the water, thus the partial breakage or damage of the electrode may increase during the electrode separation process.

After finishing up the freezing step, a step of removing the decal transfer film from the electrode specimen fixed on the frozen ice may be conducted.

The decal transfer film may be removed by peeling off from the electrode specimen which is frozen in the deionized water. As such, the electrode may be easily separated by separating only the decal transfer film from the electrode specimen without electrode damage. For example, the electrode may be separated by hands, or if necessary, the decal transfer film also may be effectively removed by using a mechanical film detachment means or device.

After removing the decal transfer film from the frozen electrode specimen, a step of separating only the electrode by thawing the frozen deionized water may be conducted.

Since the decal transfer film is already removed from the electrode specimen and the frozen water is thawed, only the separated electrode may remain and float on the thawed water. Thus, the separated electrode may be preserved without any damage. Thawing may be conducted slowly, and may be conducted by using a common heating device without limitation. When the ice is thawed, only the electrode may be floated on the water as being separated from the decal transfer film, and thus the electrode may be easily kept as it is on the water surface. Accordingly, the separated electrode floating on water may be readily used as a specimen for measuring mechanical properties of the electrode and the like.

According to various exemplary embodiments of the present invention, the electrode may be separated from the decal transfer film by using the separation method, the electrode separation may be easier and faster than the conventional electrode separation methods, and the quantification of mechanical properties of the electrode may be conducted economically and efficiently without any significant damage of the electrode. As discussed above, the decal transfer film may be removed from the electrode by freezing the electrode coated on the decal transfer film on the water surface, so as to make the interaction force between the ionomer in the electrode and the water greater than that between the electrode and the decal transfer film, and after the water is thawed, only the electrode floated on the water surface may be easily separated.

Further, provided is an apparatus for separating an electrode which is suitable for using the above described electrode separation method. The electrode used in an MEA for fuel cell vehicles may contain a Pt/C catalyst and an ionomer binder, as generally used in the related arts. The ionomer binder used in the present invention may be perfluorinated sulfonic acid-based, and the ionomer having this molecular structure may form substantial interaction with liquid water as described by K. Jiao and X. Liin Progress in Energy and Combustion Science, 37, 221 (2011); and by E. L. Thompson, T. W. Capehart, T. J. Fuller, and J. Jorne, in J. Electrochem. Soc., 153, A2351 (2006)), entire contents of which are incorporated herein. Further, the electrode may have a porous structure, and therefore, when the electrode is directly in contact with the liquid water, the pores in the electrode may be filled with the water, and the water may be substantially bound to the ionomer binder. Accordingly, when the electrode directly in contact with the liquid water is frozen at the subfreezing temperature below 0° C. or freezing temperature thereof, the electrode and the water may bind strongly. At this time, the deionized water may be used for this separation process, since the electrode may be well separated from the decal transfer film when the interaction force between the electrode and the water becomes greater than that between the electrode and the decal transfer film. The interaction force between the electrode and deionized water may be made by the strong bonding formed between the sulfonic acid group in the ionomer and water molecule.

As such, but not specifically bound to the theory, a process for independently separating an electrode from a decal transfer film by freezing water and an apparatus thereof may provide solutions to the problems associated with the related arts.

Figure 1:
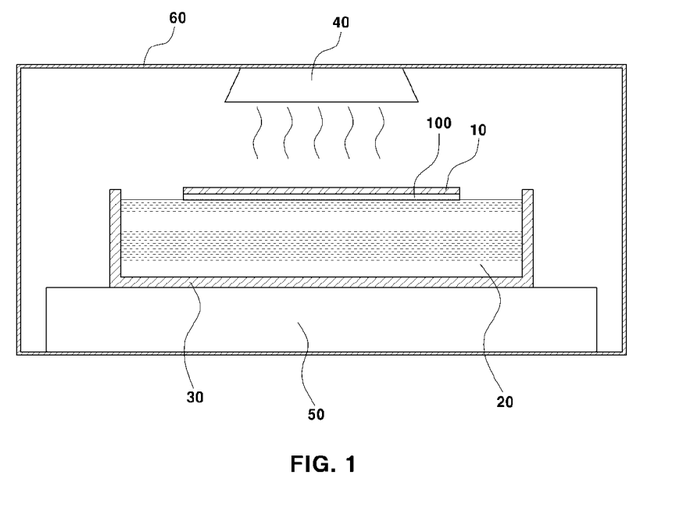
FIG. 1 shows an exemplary apparatus according to an exemplary embodiment of the present invention for separating an electrode from a decal transfer film for a fuel cell MEA.

An electrode separation apparatus for applying the electrode separation process according to the present invention will be described as an embodiment. As shown in FIG. 1, an exemplary electrode separation apparatus may be constructed as an "electrode-separating device by freezing". The apparatus may include an electrode-decal transfer film specimen 10, deionized water 20, which may well bind to an ionomer binder in an electrode 100, a specimen tester 30 containing the deionized water, a freezing device 40 that freezes the electrode floated on the deionized water of the specimen tester and the deionized water and the like. In addition, a vibration-reducing support 50 that may minimize vibration generated during freezing to reduce electrode damage, an enclosure 60 that may prevent inflow of external contaminants and the like may be further added thereto.

The specimen tester may be used for separating the electrode frozen on the deionized water surface and may be any of glass, metal, plastic materials and the like. For example, a conventional petri dish may be used as the specimen tester. When the electrode-separating device by freezing is used, the electrode may contact the surface of the water (EOWS: Electrode On Water Surface), however a method of contacting the decal transfer film toward the water surface (FOWS: Film On Water Surface) should not be used, since the EOWS method may maintain the interaction force between the water and the electrode strong.

After freezing, only the decal transfer film may be removed by peeling off from the electrode specimen frozen on the water surface, and the decal transfer film may be removed by using hands or tweezers. Further, the electrode separation apparatus may additionally have a film-removing means for safely removing of the decal transfer film. This film-removing means may have for example, a blade for detaching the decal transfer film without electrode damage.

The freezer may further include a thawing device for thawing ice after the water is frozen. The thawing device may be constructed to raise temperature, and if necessary, it may be constructed to increase the temperature to boil the water before freezing. The thawing device may be used for boiling water by heating the water before freezing, and particularly, be also used for thawing the frozen ice after freezing. Further, the thawing device also may be constructed to have both of the freezing and the heating devices.

Accordingly, after removing the decal transfer film from the electrode specimen frozen in the freezer, only the electrode may remain on the frozen ice, and then the frozen ice may be thawed by using the thawing device, leaving only the separated electrode floating on the thawed water surface.

The separated electrode may be applied to measure tensile properties of the electrode as being floated on the water, without taking the electrode from the water separately. For example, a dish containing the separated electrode may be transferred to a tensile tester, and the tensile properties of the electrode may be immediately measured as the electrode is floating on the water. As such, the electrode separation method and the separation apparatus according to the present invention may provide efficient way for measuring the mechanical properties of the electrode in a quantitative manner, without significant damage of the electrode.

Accordingly, according to various exemplary embodiments of the present invention, a pristine electrode to be used for fuel cell MEAs may be easily separated from the decal transfer film on which the electrode is coated. By separating the pristine electrode from the decal transfer film but not from an MEA, an expensive MEA may not be destroyed or sated by separate the electrode directly from the MEA. Mechanical properties of the electrode may be rapidly quantified in advance, and therefore, long term durability evaluation period during developing MEA having improved durability may be substantially reduced.

The following examples illustrate the invention and are not intended to limit the same.

Example and Comparative Example

A method for manufacturing an electrode sample coated on a decal transfer film is as follows.

General

A catalyst ink including a platinum catalyst supported on carbon (Pt/C), an ionomer binder, a solvent mixture and the like was prepared. The ionomer binder was used in the form of ionomer dispersion (Nafion D2021, DuPont, USA) which was composed of about 20 wt % of perfluorinated sulfonic acid (PFSA)-based Nafion ionomer with respect to the total weight of the ionomer dispersion (i.e., a sum of ionomer and solvents in the dispersion). An amount of about 70 wt % of Pt/C catalyst (HISPEC4000, 40 wt % Pt/C, Johnson Matthey, UK) with respect to the total weight of the solid content of the dried electrode was used as a catalyst. The Pt/C catalyst contains 40 wt % of platinum with respect to the total weight of a solid content of the Pt/C catalyst. The content of the ionomer binder in a solid phase electrode was adjusted to be about 30 wt % with respect to the total weight of the solid content of the dried electrode. Such Nafion ionomer binder and Pt/C catalyst were mixed together with a solvent mixture containing deionized water (Millipore Co., USA), isopropyl alcohol (Duksan Pure Chemicals, Korea) and the like as main ingredients, to obtain the catalyst ink, and then stirred in a mixer (WiseStir, Daihan Scientific Co., Korea) at room temperature for about 3 days. At this time, the catalyst ink was ultrasonicated total 8 times (based on 1 hour/time) using an ultrasonicator (3510E-DTH, Bransonic Ultrasonics Cor., USA) while stirring. After mixing was completed, the mixed catalyst ink was coated on a decal transfer film using a bar coater, and then fully dried in a dryer at a temperature of about 80° C. for about 2 hours. The amount of the catalyst ink and thickness were adjusted to make the Pt catalyst loading in the electrode coated on the decal transfer film to be of about 0.05 to 0.4 mg-Pt/cm$^2$. At this time, a variety of polymer films such as polytetrafluoroethylene (PTFE), poly(ethylene terephthalate) (PET), poly(butylene terephthalate) (PBT), poly(trimethylene terephthalate) (PTT), poly(ethylene naphthalate) (PEN), polyimide (PI) and the like, which have excellent mechanical properties and excellent separability from an electrode when manufacturing an MEA by a hot press or a roll-lamination process, may be used as the decal transfer film, and in the present invention. For example, the PEN film was used.

Example and Comparative Examples

The electrode coated on the decal transfer film as described above was used as a specimen of Example and Comparative Example.

Deionized water used for freezing the electrode may have resistivity of at least of about 10 MΩcm to maintain its purity, and herein, only deionized water having the resistivity of about 18 MΩcm or greater when freezing the electrode was used. Further, in order to remove bubbles which may disturb freezing and separation of the electrode in the deionized water, the deionized water was fully boiled at a temperature of boiling point or higher in advance, and then cooled down to room temperature, before using. When freezing the electrode on water surface, all the tests were conducted at a temperature of about −6° C., and the freezing time was maintained for at least about 2 hours.

Figure 2:
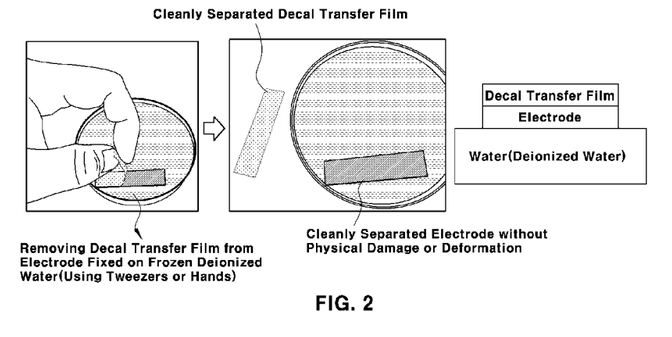
FIG. 2 illustrates an exemplary separation result according to an exemplary method for separating an electrode by directly attaching the electrode to the deionized water surface followed by freezing thereof (EOWS: Electrode On Water Surface) according to an exemplary embodiment of the present invention, and schematically illustrates the cross-sectional structure of EOWS.
Figure 3:
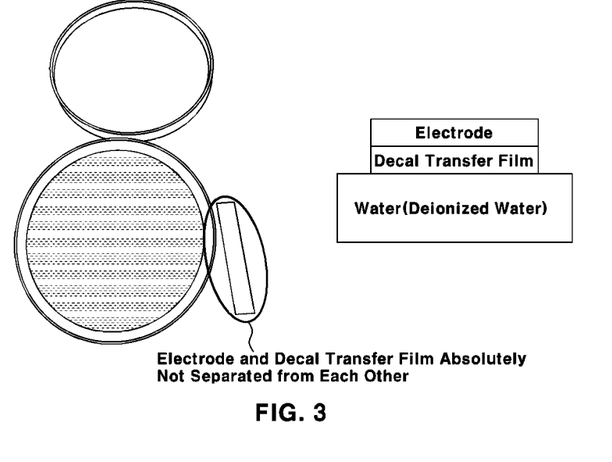
FIG. 3 shows a separation result when an electrode by directly attaching a decal transfer film to the deionized water surface followed by freezing thereof (FOWS: Film On Water Surface) according to Comparative Example, and schematically illustrates the cross-sectional structure of FOWS.

Effects of the differences in the contacting components (electrode vs. decal transfer film) on the deionized water surface on the electrode separation are shown in FIG. 2 and FIG. 3. In the tests of FIG. 2 and FIG. 3, the electrode specimens having the ionomer binder content of about 30 wt % with respect to the total weight of the solid content of the dried electrode and the platinum catalyst loading of about 0.4 mg-Pt/cm$^2$ were used.

FIG. 2 shows the separation result according to an exemplary method for separating an electrode by directly contacting the electrode onto the deionized water surface followed by freezing thereof (EOWS). As shown in FIG. 2, the electrode was easily separated from the decal transfer film without any deformation or damage of the electrode, since the interaction force between the electrode and the deionized water was increased substantially by freezing and became greater than the interaction force between the electrode and the decal transfer film (i.e., electrode-water interaction force>electrode-decal transfer film interaction force).

On the other hand, FIG. 3 shows the separation result according to a method for separating an electrode by directly contacting the decal transfer film, instead of the electrode, onto the deionized water surface followed by freezing thereof (FOWS). As shown in FIG. 3, the electrode was not separated from the decal transfer film at all, since the interaction force between the deionized water and the decal transfer film was very weak and practically negligible even though the water was frozen and was not become greater than the interaction force between the electrode and the decal transfer film (i.e., water-decal transfer film interaction force<electrode-decal transfer film interaction force).

Figure 4A:
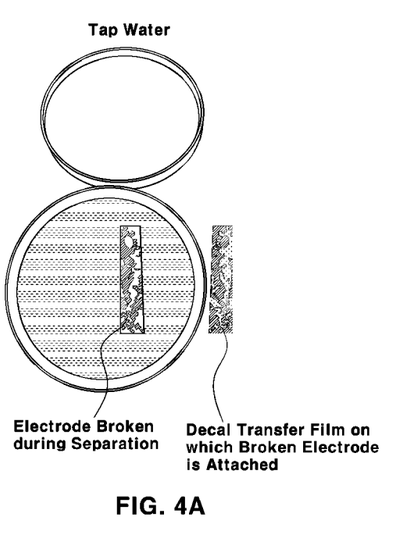
FIG. 4A shows the case of using general tap water.
Figure 4B:
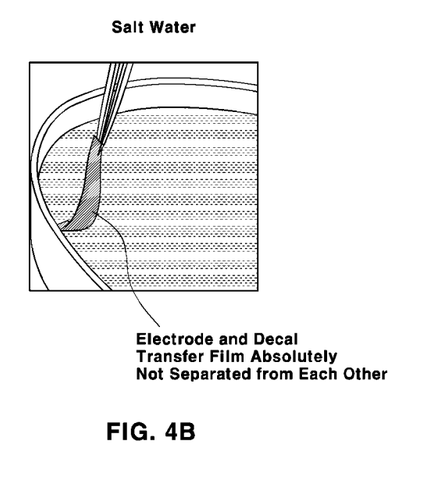
FIG. 4B shows the case of using salt water from Comparative Examples.
Figure 4C:
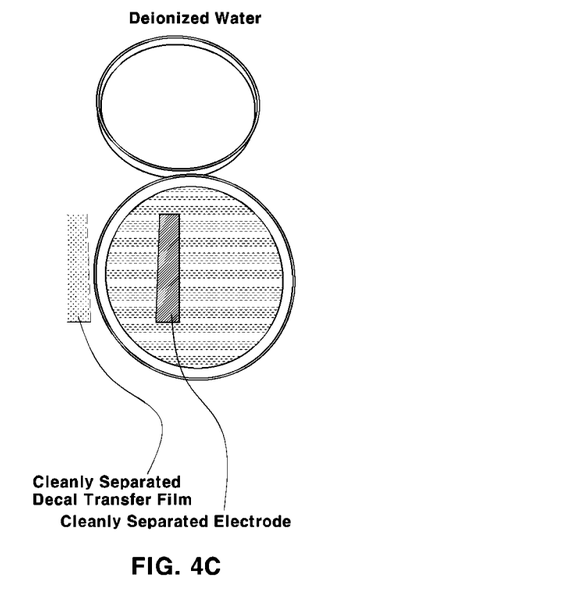
FIG. 4C shows the case of using deionized water according to an exemplary embodiment of the present invention.

Effects of water type on the separation of the electrode are shown in FIGS. 4A-4C. As shown in FIGS. 4A-4C, the electrode specimens having the ionomer binder content of about 30 wt % with respect to the total weight of the solid content of the dried electrode and the platinum catalyst loading of about 0.4 mg-Pt/cm$^2$ were used and the EOWS method was employed. FIG. 4A shows the separation result when the tap water was used in the electrode separation test. The electrode was severely damaged during separation from the decal transfer film, since various minerals and ion ingredients contained in the tap water disturbed the interaction between the water molecules and the ionomer binder in the electrode. As another example, FIG. 4B shows the separation result when the salt water was used in the electrode separation test. The salt water having a concentration of about 1M (Molarity, mol/L) was prepared by mixing sodium chloride (Merck Co., Germany) with the deionized water previously boiled and cooled. After freezing the electrode using the salt water of the said concentration, the electrode was not separated from the decal transfer film at all since Na$^+$ cations present in the salt water were strongly bound to the ionomer binder and function as impurities and strongly disturbed the interaction between the water molecules and the ionomer binder. FIG. 4C shows the separation result when the deionized water was used in the electrode separation test according to an exemplary embodiment of the present invention. The deionized water was fully boiled in advance to remove bubble that may disturb the electrode separation, and then cooled down to room temperature prior to being used for the test. As shown in FIG. 4C, only when using the deionized water, the electrode was well separated from the decal transfer film without physical deformation or damage. Thus, the deionized water previously boiled and cooled may be effectively used to separate the electrode from the decal transfer film.

Figure 5A:
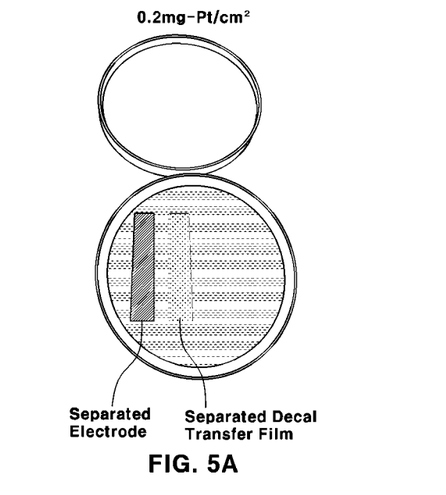
FIG. 5A represents the cases of electrodes with platinum catalyst loadings of about 0.2
Figure 5B:
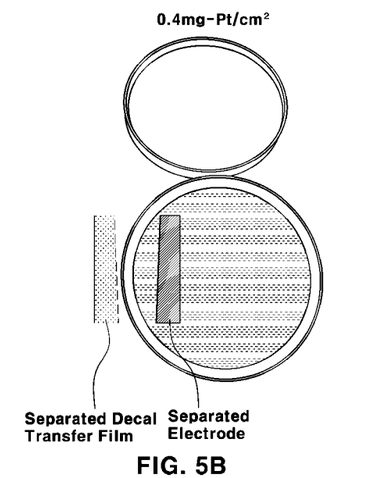
FIG. 5B represents the cases of electrodes with platinum catalyst loadings of about 0.4 mg-Pt/cm$^2$.

Further, the effects of platinum catalyst loading on the separation of the electrode are illustrated in FIGS. 5A-5B. In the test of FIGS. 5A-5B, electrode specimen having the ionomer binder content of about 30 wt % with respect to the total weight of the solid content of the dried electrode and the platinum catalyst content of about 0.2 or about 0.4 mg-Pt/cm$^2$ was used, and it was tested by freezing in the deionized water, which was boiled in advance to remove bubbles, at a temperature of about −6° C. according to the EOWS method. As shown in FIG. 5A, the electrode with a lower platinum catalyst loading of about 0.2 mg-Pt/cm$^2$ was separated well from the decal transfer film without deformation or damage, like the electrode having the platinum catalyst loading of about 0.4 mg-Pt/cm$^2$ of FIG. 5B. Accordingly, it is believed that the present method may be suitably applied to electrodes containing typical loadings of the platinum catalyst for fuel cell applications.

Figure 6A:
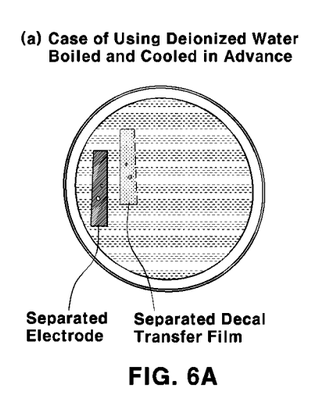
FIG. 6A is the case example of using deionized water after boiling and cooling thereof to remove bubbles.
Figure 6B:
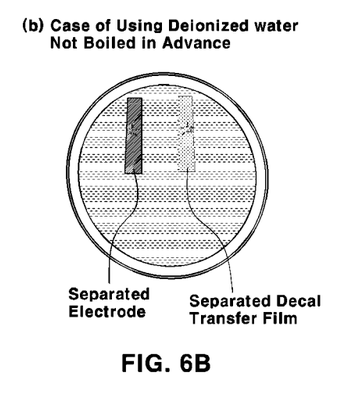
FIG. 6B is the case example of using as-received deionized water without removing bubbles.

The effects of boiling of the deionized water on the separation of the electrode are shown in FIGS. 6A-6B. As shown in FIGS. 6A-6B, the electrode specimens having the ionomer binder content of about 30 wt % with respect to the total weight of the solid content of the dried electrode and the platinum catalyst loading of 0.05 mg-Pt/cm$^2$ were used. Also, the EOWS method and freezing temperature of −6° C. were employed throughout the tests. As shown in FIG. 6A, when the electrode was frozen in the deionized water which was boiled and cooled in advance to remove bubbles, the electrode was relatively well separated from the decal transfer film although the platinum content was very small as about 0.05 mg-Pt/cm$^2$. However, as shown in FIG. 6B, it was found that when using as-received deionized water which was not boiled and cooled in advance, the electrode was not separated from the decal transfer film sufficiently without damage, leaving some attached electrode traces on the decal transfer film surface.

Figure 7:
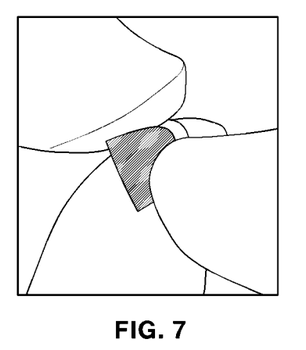
FIG. 7 shows an electrode that is not separated by hands according to Comparative Example.

As a Comparative Example, FIG. 7 shows the test result when a manual separation process by hands was used. As shown in FIG. 7, the electrode specimen having the ionomer binder content of about 30 wt % with respect to the total weight of the solid content of the dried electrode and the platinum catalyst loading of about 0.4 mg-Pt/cm$^2$ was used.

The electrode was not separated from the decal transfer film by using a manual process due to the relatively strong interaction force between electrode-decal transfer film. Furthermore, as the result of forcibly separating the electrode, the electrode damage was inevitable.

Figure 8:
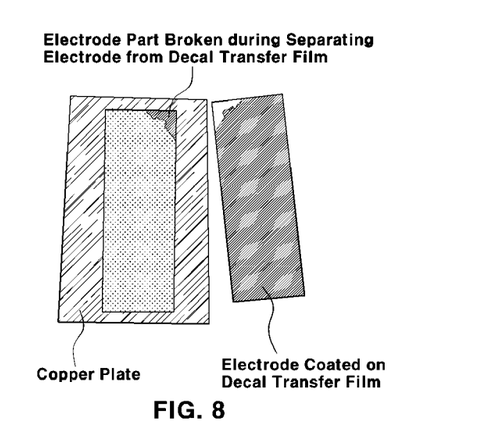
FIG. 8 shows the separation result of an electrode after fixing an electrode specimen on a copper plate by heat compression as Comparative Example.

As a Comparative Example, FIG. 8 shows the test result when a heat compression process for attaching the electrode on the copper plate was employed as a separation method. As shown in FIG. 8, the electrode specimen having the ionomer binder content of about 30 wt % with respect to the total weight of the solid content of the dried electrode and the platinum catalyst loading of about 0.4 mg-Pt/cm$^2$ was used. The electrode was not separated from the copper plate without damage because the electrode was severely deformed and damaged when separating the electrode from the decal transfer film. The significant damage of the electrode during the separation process was inevitable.

The detailed test results of Example and Comparative Example are summarized and listed in the following Table 1.

TABLE 1

| Classification | Separating Method | Pt Loading (mg/cm$^2$) | Electrode Specimen Fixing Method | Water Type | Boiling Water or Not | Freezing Time (hr) | Electrode Separation State |
|---|---|---|---|---|---|---|---|
| Example 1 | Freezing Method | 0.4 | EOWS | Deionized Water | Yes | 6 | ⊚ |
| Example 2 | Freezing Method | 0.4 | EOWS | Deionized Water | No | 6 | ○ |
| Example 3 | Freezing Method | 0.4 | EOWS | Deionized Water | Yes | 4 | ⊚ |
| Example 4 | Freezing Method | 0.2 | EOWS | Deionized Water | Yes | 6 | ⊚ |
| Example 5 | Freezing Method | 0.1 | EOWS | Deionized Water | Yes | 6 | ⊚ |
| Example 6 | Freezing Method | 0.05 | EOWS | Deionized Water | Yes | 6 | ○ |
| Comparative Example 1 | Hand Separation | 0.4 | — | | | — | XX |
| Comparative Example 2 | Copper Plate | 0.4 | — | | | — | X |
| Comparative Example 3 | Freezing Method | 0.4 | FOWS | Deionized Water | Yes | 6 | XX |
| Comparative Example 4 | Freezing Method | 0.4 | EOWS | Tap Water | Yes | 6 | XX |
| Comparative Example 5 | Freezing Method | 0.4 | EOWS | Salt Water | Yes | 6 | XX |

In the results of electrode separation state shown in the above Table 1, the marks refers ⊚: very excellent, ○: excellent, x: partial damage, xx: complete damage or separation impossible, respectively. These are comprehensively evaluated results after each test was repeated several times.

The process for separating an electrode according to various exemplary embodiments of the present invention may easily separate the electrode from the decal transfer film for fuel cell MEAs, thereby enabling rapid and easy quantification of mechanical properties of the electrode. Thus, long term durability evaluation period during developing MEA having excellent durability can be substantially reduced without breaking or wasting the expensive MEA.

These techniques for separating an electrode and quantifying its mechanical properties described herein have never been tried before because an electrode was not separated without any damage or deformation. Accordingly, the present invention has an effect that the mechanical properties of the pristine electrode may be simply and economically quantified, compared to the conventional methods.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A process for separating an electrode from a decal transfer film for membrane electrode assemblies (MEAS) of fuel cells, comprising:
   preparing an electrode specimen by coating an electrode on a decal transfer film;
   soaking the electrode specimen by floating the electrode side on a surface of deionized water;
   freezing the deionized water in a state that the electrode specimen is soaked on the surface of the deionized water;
   removing the decal transfer film from the electrode specimen which is adhered on the frozen deionized water; and
   separating only the electrode by thawing the frozen deionized water.

2. The process of claim 1, wherein the electrode is formed on the decal transfer film by coating a catalyst ink that comprises a platinum catalyst supported on carbon(Pt/C), an ionomer binder, and solvent mixtures on the decal transfer film, and drying thereof.

3. The process of claim 1, wherein the deionized water has a resistivity of about 10 MΩcm or greater.

4. The process of claim 1, wherein the decal transfer film is selected from the group consisting of polytetrafluoroethylene (PTFE), poly(ethylene terephthalate) (PET), poly(butylene terephthalate) (PBT), poly(trimethylene terephthalate) (PTT), poly(ethylene naphthalate) (PEN) and polyimide (PI).

5. The process of claim 1, wherein the electrode specimen is soaked on the surface of the deionized water by facing the electrode of the electrode specimen down toward the deionized water, and facing the decal transfer film up.

6. The process of claim 1 further comprising, before freezing the deionized water, removing bubbles present in the deionized water by boiling the deionized water.

* * * * *